United States Patent
Sugihara

(10) Patent No.: US 9,932,077 B2
(45) Date of Patent: Apr. 3, 2018

(54) CRAWLER

(71) Applicant: BRIDGESTONE CORPORATION, Chuo-ku, Tokyo (JP)

(72) Inventor: Shingo Sugihara, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/303,528

(22) PCT Filed: Apr. 14, 2015

(86) PCT No.: PCT/JP2015/061510
§ 371 (c)(1),
(2) Date: Oct. 12, 2016

(87) PCT Pub. No.: WO2015/159896
PCT Pub. Date: Oct. 22, 2015

(65) Prior Publication Data
US 2017/0029048 A1  Feb. 2, 2017

(30) Foreign Application Priority Data
Apr. 14, 2014  (JP) .................................. 2014-083144

(51) Int. Cl.
*B62D 55/24* (2006.01)
(52) U.S. Cl.
CPC .......... *B62D 55/244* (2013.01); *B62D 55/24* (2013.01)
(58) Field of Classification Search
CPC ...... B62D 55/18; B62D 55/24; B62D 55/244; B62D 55/26

(Continued)

(56) References Cited

U.S. PATENT DOCUMENTS 7,695,077 B2 * 4/2010 Fujita .................. B62D 55/244
                                                        305/165
7,740,326 B2 * 6/2010 Matsuo ................. B62D 55/24
                                                        305/165

(Continued)

FOREIGN PATENT DOCUMENTS

JP  H08-244657 A  9/1996
JP  2002-308163 A  10/2002

(Continued)

*Primary Examiner* — Jason Bellinger
(74) *Attorney, Agent, or Firm* — Solaris Intellectual Property Group, PLLC

(57) ABSTRACT

A rubber crawler that has a specified rotation direction. includes a crawler body, rubber projections and lugs. The lugs project out from an outer peripheral face, extend at an angle to the crawler peripheral direction from an inner side end portion toward the crawler width direction outer side and toward an opposite side to a crawler rotation direction with a larger angle at an acute angle side with respect to the crawler peripheral direction on the crawler width direction outer side than on the central line side; have inner side end portions of lugs adjacent to each other in the crawler width direction respectively overlapping a single projection of the projections, and are disposed at positions separated in the crawler width direction with the inner side end portions adjacent to each other in the crawler width direction respectively overlapping each other when viewed along the crawler width direction.

5 Claims, 7 Drawing Sheets

(58) Field of Classification Search
USPC .............. 305/165, 167, 170, 173–174, 178
See application file for complete search history.

(56) References Cited

U.S. PATENT DOCUMENTS

| | | |
|---|---|---|
| 8,628,152 B2 * | 1/2014 | Delisle .................. B29C 35/049 305/165 |
| 2002/0024256 A1 * | 2/2002 | Hori ..................... B62D 55/244 305/178 |
| 2004/0066090 A1 | 4/2004 | Akiyama et al. |
| 2004/0135433 A1 * | 7/2004 | Inaoka ................. B62D 55/244 305/157 |
| 2013/0241278 A1 | 9/2013 | Nomizo |

FOREIGN PATENT DOCUMENTS

| | | |
|---|---|---|
| JP | 2007-290595 A | 11/2007 |
| JP | 2009-184458 A | 8/2009 |
| JP | 4408624 B2 | 2/2010 |
| JP | 2013-86727 A | 5/2013 |
| WO | 2012/070609 A1 | 5/2012 |

\* cited by examiner

CRAWLER

TECHNICAL FIELD

The present invention relates to a crawler formed using an elastic material.

BACKGROUND ART

A rubber crawler is described in Japanese Patent No. 4408624. The rubber crawler has, on an outer peripheral face of a crawler body formed in an endless belt shape, lugs that extend at an angle to a crawler peripheral direction and that are allocated to one side and another side in a crawler width direction so as to be alternately disposed on progression along the crawler peripheral direction on either side of a central line of the crawler body. In this rubber crawler, the end portions on the central line side of the lugs reach as far in the crawler width direction as the central line.

SUMMARY OF INVENTION

Technical Problem

However, in the rubber crawler of Japanese Patent No. 4408624, when driving on rough ground with clayey soil, sometimes mud lodging occurs so as to be continuous along the crawler peripheral direction around the central line.

An object of the present invention is to provide a crawler that suppresses mud lodging during driving on rough ground, and that has improved traction performance.

Solution to Problem

A crawler of a first aspect of the present invention is a crawler that has a specified rotation direction. The crawler includes a crawler body that is formed from an elastic material in an endless shape entrained around a drive wheel and a follower wheel, plural projections that project out from an inner peripheral face of the crawler body on a central line passing through a crawler width direction center of the crawler body at positions spaced apart from each other in a crawler peripheral direction, and plural lugs. The plural lugs are provided at the crawler body, project out from an outer peripheral face of the crawler body, as viewed from the crawler outer peripheral side, are allocated to one side and another side in the crawler width direction so as to be alternately disposed on progression along the crawler peripheral direction on either side of the central line, extend at an angle to the crawler peripheral direction from an end portion on the central line side toward the crawler width direction outer side and toward an opposite side to a crawler rotation direction with a larger angle at an acute angle side with respect to the crawler peripheral direction on the crawler width direction outer side than on the central line side, have end portions on the central line side adjacent to each other in the crawler width direction respectively overlapping a single projection of the projections, and are disposed at positions separated in the crawler width direction with end portions on the central line side adjacent to each other in the crawler width direction respectively overlapping each other when viewed along the crawler width direction.

Advantageous Effects of Invention

As explained above, the crawler of the first aspect of the present invention is able to improve an earth discharging ability when driving on rough ground.

DESCRIPTION OF EMBODIMENTS

Explanation follows regarding a crawler according to an exemplary embodiment of the present invention.

Figure 1:
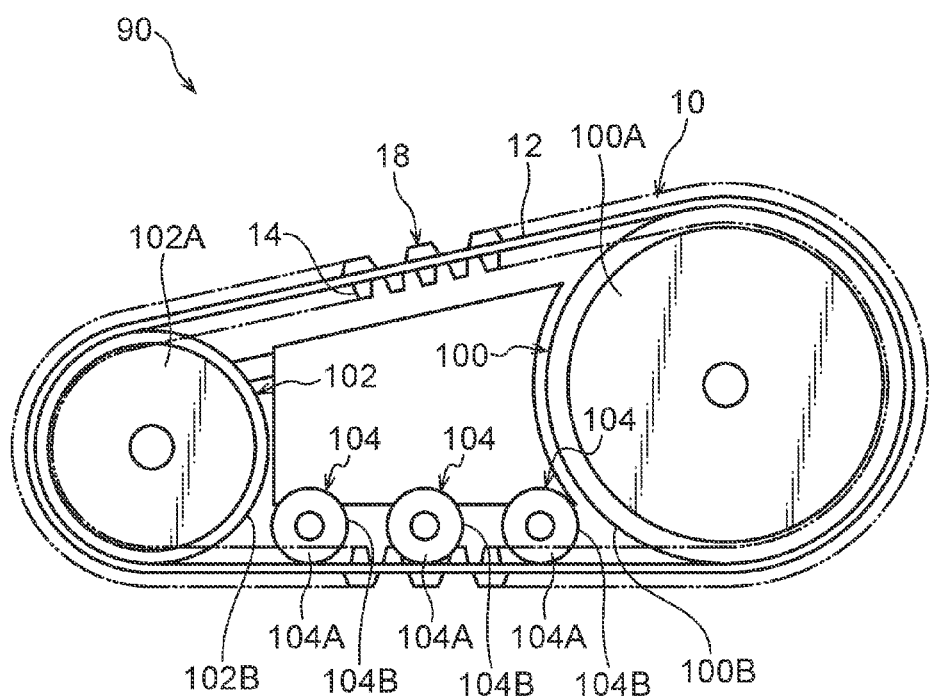
FIG. 1 is a side view of a rubber crawler of an exemplary embodiment of the present invention, as viewed from the side (along a crawler width direction).
Figure 2:
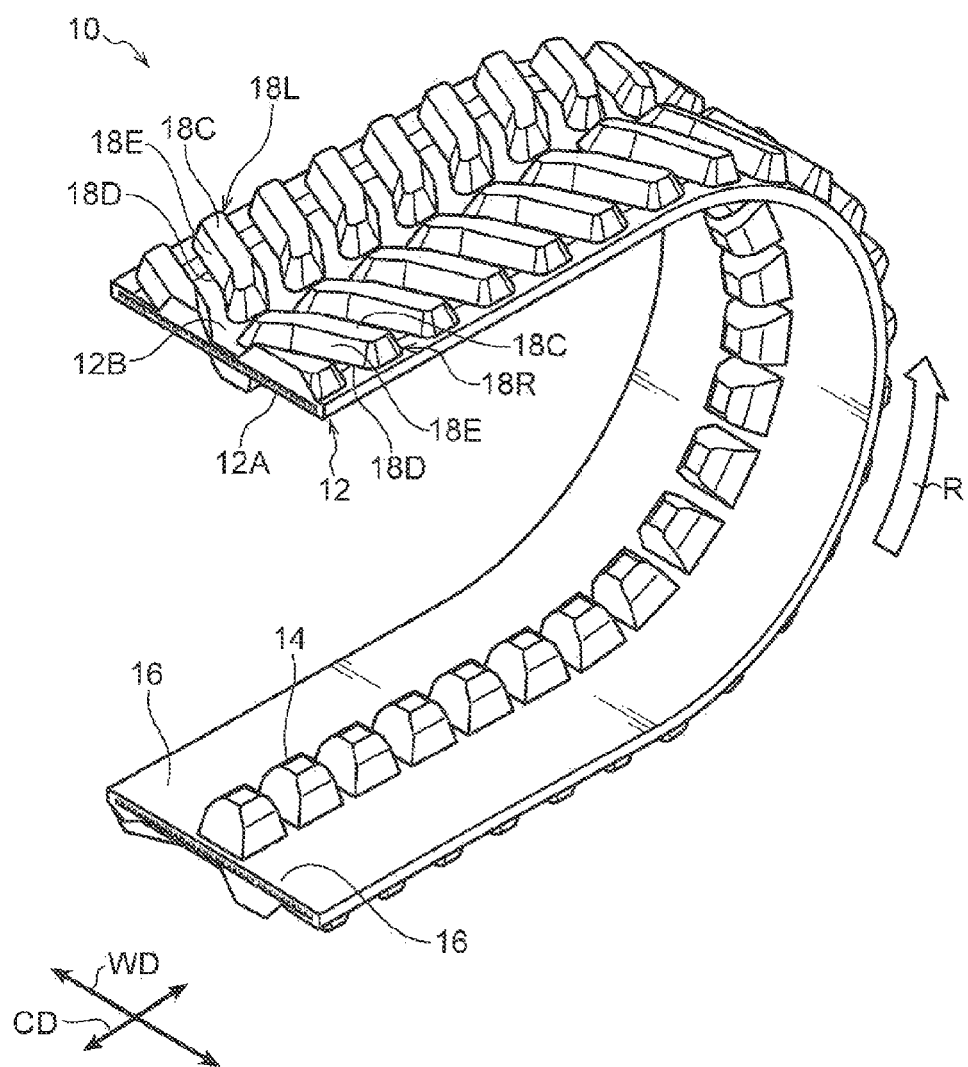
FIG. 2 is a perspective view including a partial cross-section of a rubber crawler of an exemplary embodiment of the present invention.

As illustrated in FIG. 1 and FIG. 2, an endless rubber crawler 10, serving as a crawler, according to the exemplary embodiment of the present invention is what is referred to as a coreless type rubber crawler that does not have a metal core, and has a specified rotation direction.

As illustrated in FIG. 1, the rubber crawler 10 is employed entrained around a drive wheel 100 coupled to a drive shaft of a tracked vehicle serving as a vehicle body, and an idle wheel 102 that is attached to the tracked vehicle so as to be freely rotatable. Plural rollers 104, disposed between the drive wheel 100 and the idle wheel 102 and attached to the tracked vehicle so as to be freely rotatable, roll against an inner circumference of the rubber crawler 10.

Note that the drive wheel 100 of the present exemplary embodiment is an example of a drive wheel of the present invention, and the idle wheel 102 and the rollers 104 of the present exemplary embodiment are each examples of a follower wheel of the present invention.

In the present exemplary embodiment, a peripheral direction (illustrated by the arrow CD in FIG. 2) of the endless rubber crawler 10 is referred to as the "crawler peripheral direction", and a width direction (illustrated by the arrow WD in FIG. 2) of the rubber crawler 10 is referred to as the "crawler width direction". Note that the crawler peripheral direction (synonymous with the length direction of the rubber crawler 10) and the crawler width direction are orthogonal to each other as viewed from an inner peripheral side or an outer peripheral side of the rubber crawler 10.

In the present exemplary embodiment, the inner peripheral side (the side in the direction indicated by the arrow IN in FIG. 6) of the rubber crawler 10 entrained in an annular shape (encompassing circular annular shapes, elliptical annular shapes, polygonal annular shapes, and the like) around the drive wheel 100 and the idle wheel 102 is referred to as the "crawler inner peripheral side", and the outer peripheral side of the rubber crawler 10 (the side in the direction indicated by the arrow OUT in FIG. 6) is referred to as the "crawler outer peripheral side". Note that the arrow IN direction (the direction toward the inside of the annular shape) and the arrow OUT direction (the direction toward the outside of the annular shape) in FIG. 6 indicate in/out directions of the rubber crawler 10 when in an entrained state (synonymous with a thickness direction of the rubber crawler 10).

Note that although the present exemplary embodiment is configured such that the rubber crawler 10 is entrained around the drive wheel 100 and the idle wheel 102, there is no limitation thereto. For example, depending on the layout of the drive wheel 100, the idle wheel 102, and the rollers 104, the rubber crawler 10 may be entrained around one or plural rollers 104 in addition to the drive wheel 100 and the idle wheel 102.

The drive wheel 100, the idle wheel 102, the rollers 104, and the rubber crawler 10 entrained thereon configure a crawler traveling device 90 (see FIG. 1), serving as a traveling section of the tracked vehicle.

As illustrated in FIG. 1, the drive wheel 100 includes a pair of circular disk shaped wheel portions 100A that are coupled to the drive shaft of the tracked vehicle. Outer circumferential surfaces 100B of the wheel portions 100A respectively contact wheel-rotated faces 16 of a crawler body 12, described later, and roll against the wheel-rotated faces 16. The drive wheel 100 causes drive force from the tracked vehicle to act on the rubber crawler 10 (described in detail later), and circulates the rubber crawler 10 between the drive wheel 100 and the idle wheel 102.

The idle wheel 102 includes a pair of circular disk shaped wheel portions 102A attached to the tracked vehicle so as to be freely rotatable. Outer circumferential surfaces 102B of the wheel portions 102A respectively contact the wheel-rotated faces 16, and roll against the wheel-rotated faces 16. The idle wheel 102 is moved in a direction away from the drive wheel 100 and pressed against the wheel-rotated faces 16 by, for example, a hydraulic pressing mechanism, not illustrated in the drawings, provided at the tracked vehicle. Tension (pull) in the rubber crawler 10 entrained around the drive wheel 100 and the idle wheel 102 is maintained by pressing the idle wheel 102 against the wheel-rotated faces 16 in this manner.

The rollers 104 each include a pair of circular disk shaped wheel portions 104A attached to the tracked vehicle so as to be freely rotatable. Outer circumferential surfaces 104B of the wheel portions 104A respectively contact the wheel-rotated faces 16 and roll against the wheel-rotated faces 16. The weight of the tracked vehicle is supported by the rollers 104. Note that the idle wheel 102 and the rollers 104 rotate following the rubber crawler 10 circulating between the drive wheel 100 and the idle wheel 102.

Note that the rubber crawler 10 (crawler body 12) is entrained around the drive wheel 100 and the idle wheel 102 under a specific tension. Accordingly, frictional force arises between the outer circumferential surfaces 100B of the drive wheel 100 and the wheel-rotated faces 16, transmitting drive force of the drive wheel 100 to the rubber crawler 10, and circulating the rubber crawler 10 between the drive wheel 100 and the idle wheel 102 such that the rubber crawler 10 travels.

As illustrated in FIG. 1 and FIG. 2, the rubber crawler 10 includes the crawler body 12 configured by forming a rubber material, this being an example of an elastic material, into an endless belt shape. Note that the crawler body 12 of the present exemplary embodiment is an example of an endless belt shaped crawler body of the present invention. The peripheral direction, the width direction, the inner peripheral side, and the outer peripheral side of the crawler body 12 of the present exemplary embodiment respectively match the crawler peripheral direction, the crawler width direction, the crawler inner peripheral side, and the crawler outer peripheral side.

Figure 3:
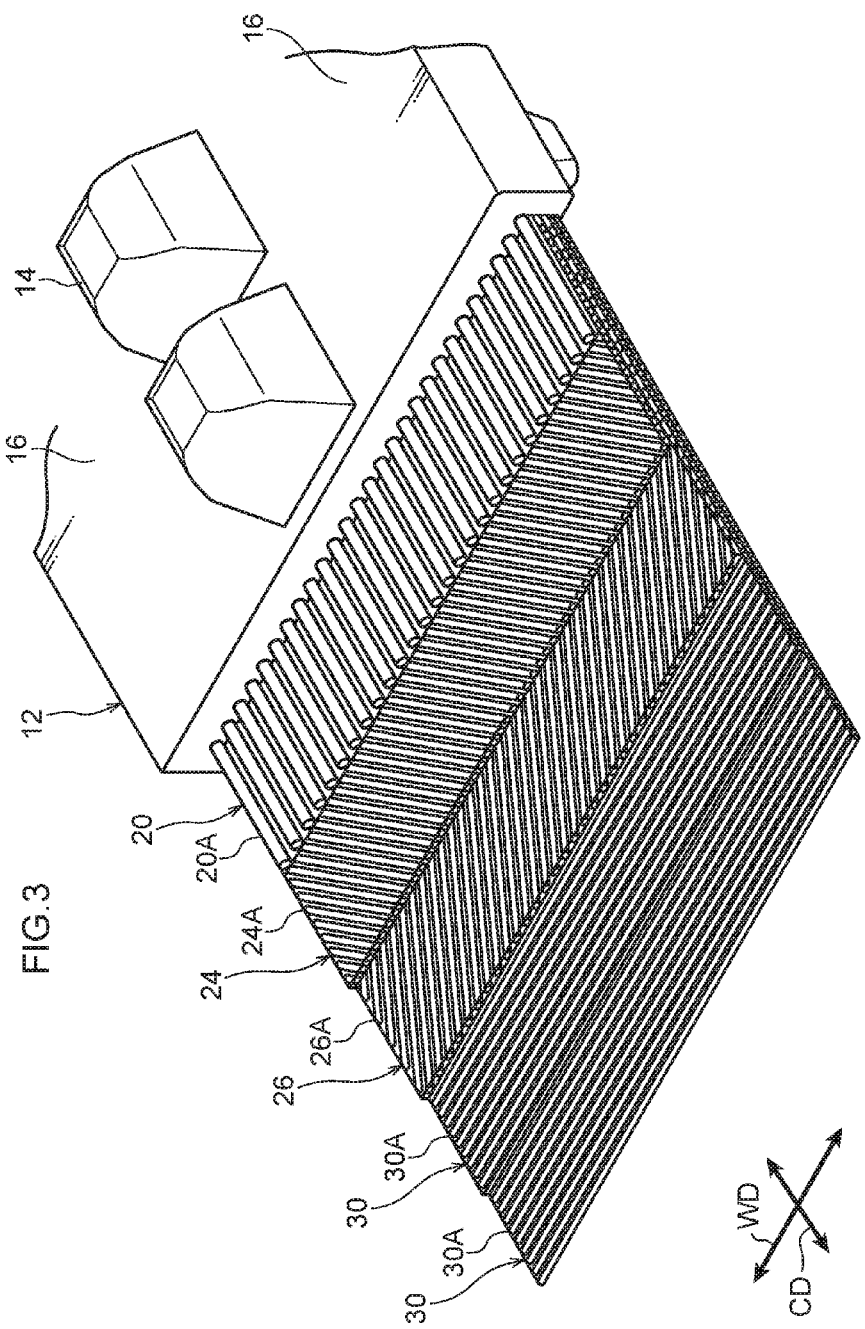
FIG. 3 is a perspective view including a partial cross-section of respective cord layers of a rubber crawler of an exemplary embodiment of the present invention.

As illustrated in FIG. 2 and FIG. 3, at spacings from each other around the crawler peripheral direction, the crawler body 12 is formed with plural rubber projections 14 projecting out from an inner peripheral surface 12A toward the crawler inner peripheral side. The rubber projections 14 are disposed along a central line CL passing through the crawler width direction center of the crawler body 12. The rubber projections 14 restrict movement of the wheels in the crawler width direction by contacting the wheels (referring to the drive wheel 100, the idle wheel 102, and the rollers 104) rolling against the wheel-rotated faces 16. In other words, by contacting the wheels, the rubber projections 14 are capable of suppressing relative movement of the rubber crawler 10 and the wheels in the crawler width direction. Namely, the rubber projections 14 are capable of suppressing lateral misalignment of the rubber crawler 10 with respect to the wheels. Note that the rubber projections 14 of the present exemplary embodiment are examples of projections of the present invention.

In the present exemplary embodiment, the rubber projections 14 are laid out on the crawler body 12 such that the crawler width direction center of the rubber projections 14 is positioned on the central line CL. However, the present invention is not limited to such a configuration, and it is sufficient to lay out the rubber projections 14 on the crawler body 12 such that part of each of the rubber projections 14 is positioned on the central line CL. For example, the crawler width direction center of the rubber projections 14 may be shifted to one side or the other side in the crawler width direction with respect to the central line CL.

Figure 6:
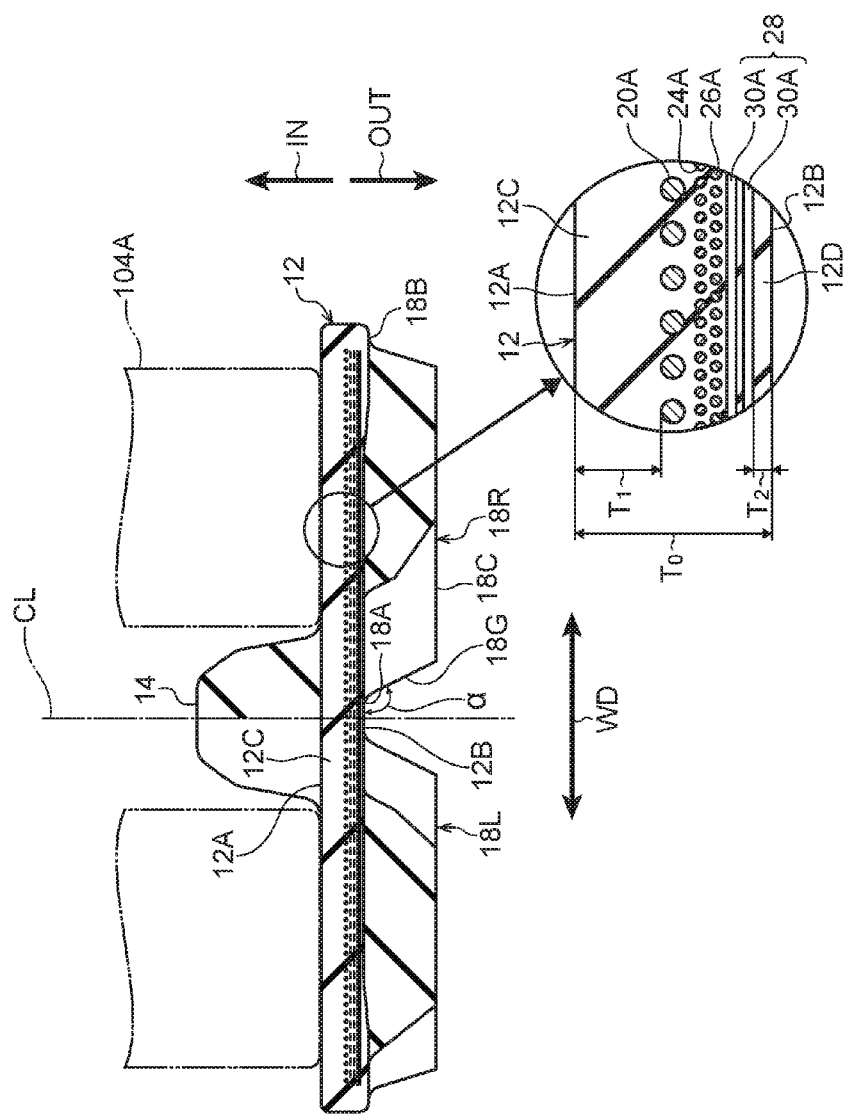
FIG. 6 is a cross section taken along line 6X-6X of the rubber crawler in FIG. 4.

As illustrated in FIG. 2 and FIG. 6, the respective wheel-rotated faces 16 are formed extending along the crawler peripheral direction at a crawler width direction outer side of the crawler body 12, with the rubber projections 14 interposed therebetween. The wheel-rotated faces 16 are configured with flat profiles, and configure a portion of the inner peripheral surface 12A of the crawler body 12.

Note that although in the present exemplary embodiment configuration is such that the faces between the rubber projections 14 and the wheel-rotated faces 16 on the inner peripheral surface 12A of the crawler body 12 are in the same plane (at the same height in this case) as each other, the present invention is not limited to such a configuration. For example, the wheel-rotated faces 16 may be configured so as to rise up more toward the crawler inner peripheral side than the faces between the rubber projections 14, or may be configured so as to be hollowed out toward the crawler outer peripheral side (a configuration provided with indentations).

Lugs

Figure 4:
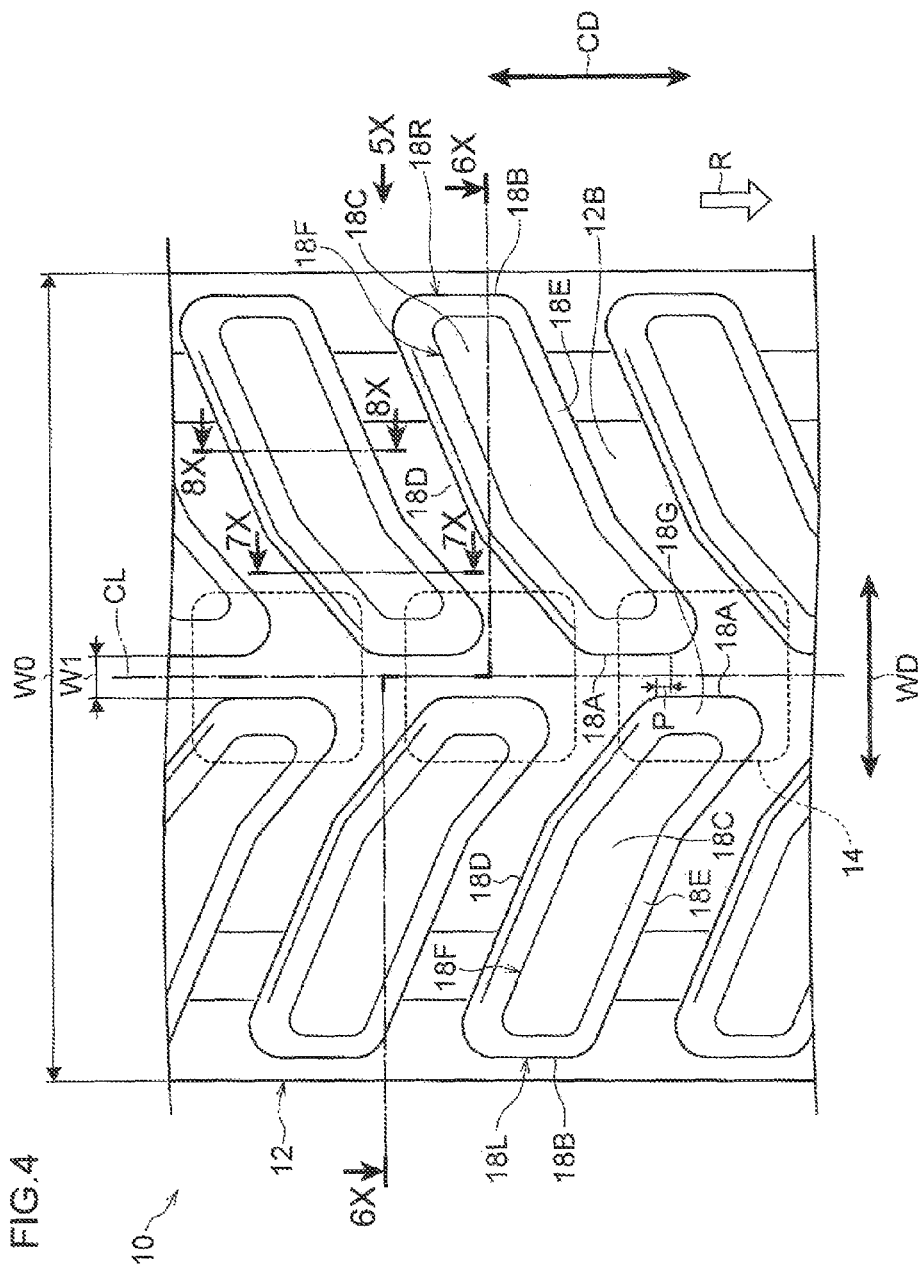
FIG. 4 is a plan view of a rubber crawler of an exemplary embodiment of the present invention, as viewed from the crawler outer peripheral side.

As illustrated in FIG. 1 and FIG. 2, plural lugs 18 are provided on the crawler body 12 so as to project out from the outer peripheral face 12B toward the crawler outer peripheral side. As illustrated in FIG. 4, the lugs 18 are allocated to one side (the left side in FIG. 4) and another side (the right side in FIG. 4) in the crawler width direction on either side of the central line CL of the crawler body 12 so as to be alternately disposed on progression along the crawler peripheral direction on the one side or the other side. For convenience, the lugs 18 on the one side in the crawler width direction will be referred to below as the lugs 18L, and the lugs 18 on the other side in the crawler width direction will be referred to below as the lugs 18R.

Note that in the present exemplary embodiment, the placement interval of the lugs 18L in the crawler peripheral direction is the same placement interval as the placement interval of the rubber projections 14. Similarly, the placement interval of the lugs 18R in the crawler peripheral direction is the same placement interval as the placement interval of the rubber projections 14.

The lugs 18 extend from an inner side end 18A on the central line CL side thereof toward the crawler width direction outer side and toward the opposite side to the crawler rotation direction side (at an angle toward the upper side in FIG. 4) so as to extend at inclination to the crawler peripheral direction. Note that reference here to the "crawler rotation direction" means the rotation direction of the rubber crawler 10 when the tracked vehicle is driven (advances) (the arrow R direction in FIG. 4). Due to configuration as described above, the inner side end 18A side of the lugs 18 makes ground contact before the outer side end 18B side thereof. Note that reference here to the inner side end 18A means the inner side end on the central line CL side at the base portion 18D of the lugs 18, and the outer side end 18B means the outer side end on the crawler width direction outer side at the base portion 18D of the lugs 18.

Moreover, as illustrated in FIG. 4, there is a larger angle on the acute angle side to the crawler peripheral direction further to the crawler width direction outer side of the lugs 18 than that on the central line CL side thereof. Note that the lugs 18 in the present exemplary embodiment are configured so as to extend in a straight line at an angle to the crawler peripheral direction, and to be bent partway along (a 2-stage angled configuration). Each of the lugs 18 of the present exemplary embodiment accordingly includes a tread-in-side wall face 18E and a kick-out-side wall face 18F, described later, that are each angled in 2-stages with respect to the crawler peripheral direction. Note that the present invention is not limited to the above configuration. For example, the lugs 18 may adopt a multi-stage angled configuration with respect to the crawler peripheral direction (a configuration in which the tread-in-side wall face 18E and the kick-out-side wall face 18F are respectively angled in multiple stages with respect to the crawler peripheral direction), or a configuration curved in a curved line with respect to the crawler peripheral direction (a configuration in which the tread-in side wall face 18E and the kick-out side wall face 18F are respectively curved with respect to the crawler peripheral direction).

Figure 7:
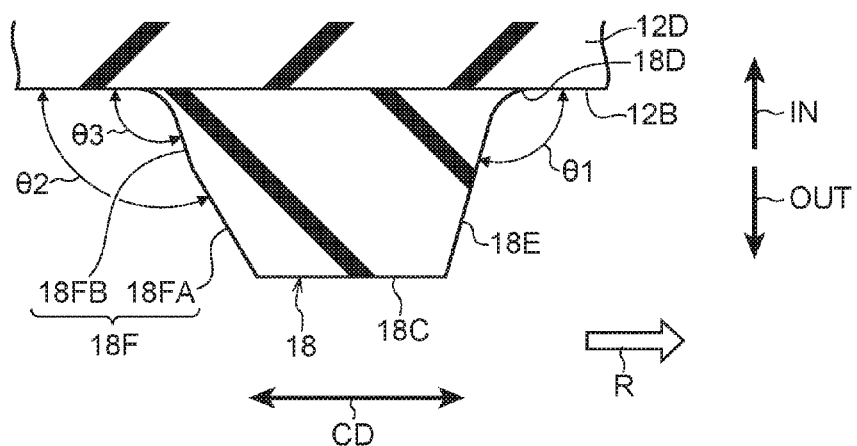
FIG. 7 is a cross-section taken along line 7X-7X of the rubber crawler in FIG. 4.
Figure 8:
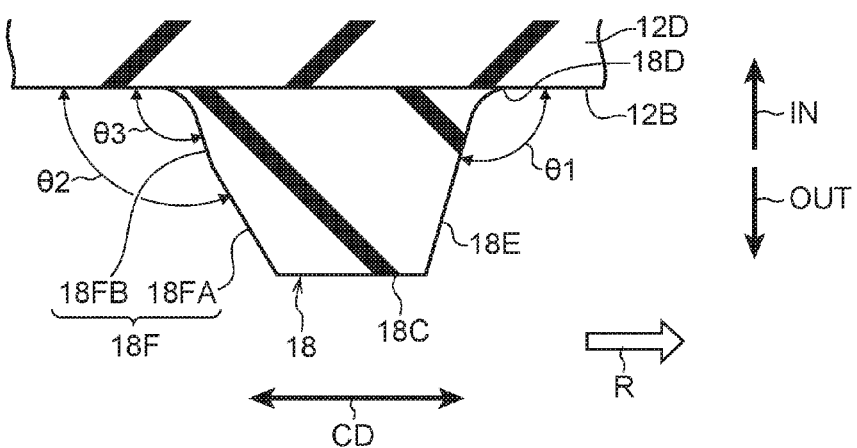
FIG. 8 is a cross-section taken along line 8X-8X of the rubber crawler in FIG. 4.

As illustrated in FIG. 7 and FIG. 8, in a cross-section taken along the crawler peripheral direction, the tread-in-side wall face 18E on the crawler rotation direction side (in other words, on the tread-in-side) of the lugs 18 is angled (which has the same meaning here as tilted) with respect to the outer peripheral face 12B of the crawler body 12. More specifically, the tread-in-side wall face 18E is sloped at a fixed angle to the outer peripheral face 12B from the vicinity of an apex portion 18C of the lugs 18 to the vicinity of the base portion 18D thereof. Moreover, an angle θ1 formed between the tread-in-side wall face 18E and the outer peripheral face 12B is 90 degrees or greater, but is smaller than an angle θ2, described later.

Moreover, in a cross-section taken along the crawler peripheral direction, the kick-out-side wall face 18F, on the opposite side of the lugs 18 to the crawler rotation direction (in other words, on the kick-out-side), is angled (which has the same meaning here as tilted) in 2-stages with respect to the outer peripheral face 12B of the crawler body 12. Specifically, the kick-out-side wall face 18F is angled with respect to the outer peripheral face 12B at a fixed angle θ2 from the vicinity of the apex portion 18C of the lugs 18 to a lug projection height intermediate portion thereof, and is angled with respect to the outer peripheral face 12B at a fixed angle θ3 from the intermediate portion to the vicinity of the base portion 18D. on kick-out-side wall face 18F, the angle θ2, formed between an apex side portion 18FA on the apex portion 18C side and the outer peripheral face 12B, is larger than the angle θ3 formed between a base side portion 18FB on the base portion 18D side and the outer peripheral face 12B. The angle θ3 is set so as to exceed 90 degrees.

The angle θ1 of the tread-in-side wall face 18E of the lugs 18 is smaller on the outer side end 18B side than on the inner side end 18A side of the lugs 18. Moreover, the angle θ2 of the kick-out-side wall face 18F of the lugs 18 is smaller on the outer side end 18B side than on the inner side end 18A side of the lugs 18. Note that the angle θ3 of the kick-out-side wall face 18F may be the same on the outer side end 18B side as on the inner side end 18A side of the lugs 18, or may be smaller on the outer side end 18B side than on the inner side end 18A side thereof.

The angle θ1 of the lugs 18 is preferably set within a range of from 102 degrees to 115 degrees, and the angle θ2 is preferably set within a range of from 118 degrees to 132 degrees, and the angle θ3 is preferably set within a range of from 104 degrees to 118 degrees.

As illustrated in FIG. 4, lugs 18 that are adjacent to each other in the crawler width direction (a lug 18L and a lug 18R) have inner side ends 18A that respectively overlap with each other when viewed along the crawler width direction. In FIG. 4, the range over which the inner side ends 18A respectively overlap when viewed along the crawler width direction as described above (the overlap range) is indicated by the label P.

As viewed from the crawler outer peripheral side, the inner side ends 18A of lugs 18 that are adjacent to each other in the crawler width direction respectively overlap with a single rubber projection 14. Moreover, as viewed from the crawler outer peripheral side, the inner side ends 18A of lugs 18 adjacent to each other in the crawler width direction are respectively disposed at positions separated from each other in the crawler width direction. Specifically, a length W1 along a crawler width direction between inner side ends 18A of respective lugs 18 adjacent to each other in the crawler width direction is set so as to be within a range of from 4% to 10% of a length W0 along the crawler width direction of the crawler body 12.

The lugs 18 are set with an angle α formed between an inner side wall face 18G on the central line CL side thereof and an outer peripheral face 12B within a range of from 110 degrees to 120 degrees.

In the present exemplary embodiment, the lugs 18 are configured so as to have left-right symmetry about the central line CL; however, the present invention is not limited to such a configuration. For example, the lugs 18 may be configured so as to have left-right asymmetry about the central line CL.

Cord Layer

Figure 5:
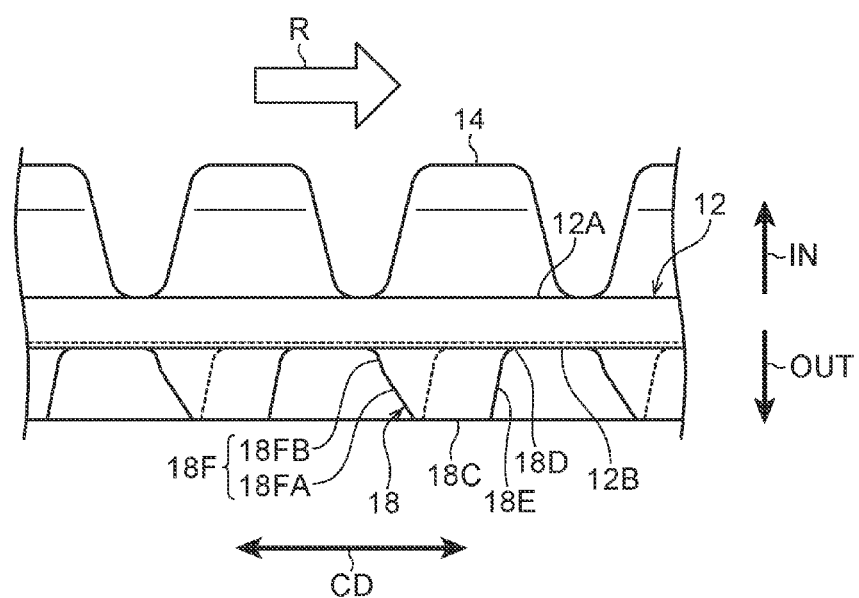
FIG. 5 is a side view of the rubber crawler of FIG. 4 as viewed from the arrow 5X direction.

As illustrated in FIG. 3 and FIG. 5, a main cord layer 20, a first bias cord layer 22, a second bias cord layer 23, and a protection cord layer 28 are embedded in the crawler body 12 in that sequence from the crawler inner peripheral side.

The main cord layer 20 is an endless belt shape, and is superimposed at the crawler outer peripheral side of a body inner peripheral portion 12C forming the inner peripheral surface 12A of the crawler body 12. The main cord layer 20 includes main cords 20A extending along the crawler peripheral direction. The main cords 20A are configured by plural strands twisted together. In the present exemplary embodiment, as an example, the strands are formed by twisting together plural filaments; however, the present invention is not limited to such a configuration. The main cords 20A are covered in rubber.

Moreover, although in the present exemplary embodiment steel cords having excellent tensile strength are employed as the main cords 20A, the present invention is not limited to such a configuration, and organic fiber cords configured by organic fibers (for example, nylon fibers, aromatic polyamide fibers or the like) may be employed as the main cords 20A, as long as they have sufficient tensile strength.

The first bias cord layer 22 is configured in an endless belt shape, and is superimposed on the main cord layer 20 at the crawler outer peripheral side thereof. The first bias cord layer 22 includes an endless belt shaped bias ply 24 formed by embedding bias cords 24A in belt shaped rubber, such that the bias cords 24A extend at an angle with respect to the crawler peripheral direction and plural of the bias cords 24A lie side-by-side in the crawler peripheral direction. Note that the bias ply 24 of the present exemplary embodiment is an example of a first bias ply of the present invention.

The second bias cord layer 23 is configured in an endless belt shape, and is superimposed on the first bias cord layer 22 at the crawler outer peripheral side thereof. The second bias cord layer 23 includes an endless belt shaped bias ply 26 formed by embedding bias cords 26A in belt shaped rubber, such that the bias cords 26A extend at an angle with respect to the crawler peripheral direction and intersect the bias cords 24A, and plural of the bias cords 26A lie side-by-side in the crawler peripheral direction. Specifically, the bias cords 26A are angled in the opposite direction to the bias cords 24A with respect to the crawler peripheral direction. Note that the bias ply 26 of the present exemplary embodiment is an example of a second bias ply of the present invention.

In the present exemplary embodiment, the bias cords 24A and the bias cords 26A are configured by the same steel cords. The bias cords 24A and the bias cords 26A employ steel cords with a smaller diameter than the main cords 20A, from the perspective of the bending flexibility of the rubber crawler 10. Note that the present invention is not limited to such a configuration, and organic fiber cords configured by organic fibers (for example, nylon fibers, aromatic polyamide fibers or the like) may be employed as the bias cords 24A and the bias cords 26A as long as they have sufficient tensile strength.

The protection cord layer 28 is configured in an endless belt shape, and is superimposed on the second bias cord layer 23 at the crawler outer peripheral side thereof, and is superimposed at the crawler inner peripheral side of a body outer peripheral portion 12D forming the outer peripheral face 12B of the crawler body 12. The protection cord layer 28 is formed by superimposing plural layers of endless belt shaped protection plies 30 (two plies in the present exemplary embodiment). Note that the protection plies 30 in the present exemplary embodiment are examples of the protection plies of the present invention.

The protection plies 30 are formed by plural strands of protection cord 30A that extend along the crawler width direction (in other words a direction orthogonal to the central line CL), that are arranged side-by-side in the crawler peripheral direction, and that are embedded in belt shaped rubber.

Due to the protection cords 30A extending along the crawler width direction, the protection cord layer 28 has high rigidity in the crawler width direction, or, in other words, is not liable to deform in the crawler width direction.

In the present exemplary embodiment, in a state in which the rubber crawler 10 is not yet mounted to a wheel (namely, in a state in which tension is not being applied), the protection cords 30A extend along the crawler width direction. Note that reference here to "extend along the crawler width direction" includes cases in which they are angled with respect to the crawler width direction by about ±3 degrees.

Although in the present exemplary embodiment steel cords are employed as the protection cords 30A in order to raise the rigidity in the crawler width direction, the present invention is not limited to such a configuration, and organic fiber cords configured by organic fibers (for example, nylon fibers, aromatic polyamide fibers or the like) may be employed as the protection cords 30A as long as they have sufficient rigidity in the crawler width direction.

Moreover, as illustrated in FIG. 6, a thickness T1 of the body inner peripheral portion 12C on the central line CL is thicker than a thickness T2 of the body outer peripheral portion 12D. Moreover, on the central line CL, the thickness T1 is preferably set to a thickness within a range of from 35% to 45% of a thickness T0 of the crawler body 12, and the thickness T2 is preferably set to a thickness within a range of from 16% to 26% of the thickness T0.

In the present exemplary embodiment, the main cords 20A are disposed at a central portion in the thickness direction (which means the same as the crawler in/out directions) of the crawler body 12.

Next, explanation follows regarding operation and advantageous effects of the rubber crawler 10 of the present exemplary embodiment.

In the rubber crawler 10, as illustrated in FIG. 7 and FIG. 8, in a cross-section taken along the crawler peripheral direction, the angle θ1 formed between the apex side portion of the tread-in-side wall face 18E and the outer peripheral face 12B is 90 degrees or greater, but is smaller than the angle θ2 formed between the apex side portion 18FA of the kick-out-side wall face 18F and the outer peripheral face 12B. Hence, traction is improved in the rubber crawler 10 since the force component of the driving force applied to the soil in the horizontal direction when driving on rough ground is increased compared, for example, to cases in which the angle θ1 is larger than the angle θ2. Moreover, even in cases in which the soil of the rough ground is a sandy substance, by adopting the configuration described above, soft dirt can be suppressed from being swept away from the area of the apex portion 18C of the lugs 18 that makes contact with the soil, using the tread-in-side wall face 18E. This thereby enables sliding between the apex portion 18C and the soil to be suppressed, and secures traction in the machinery body forward direction. This thereby enables traction performance to be secured by the rubber crawler 10 when driving on rough ground.

On the other hand, in the rubber crawler 10, the lugs 18 each extend from the inner side end 18A on the central line CL side toward the crawler width direction outer side, and toward the opposite side to the crawler rotation direction at an angle with respect to the crawler peripheral direction. Thus due to the projected surface area of the lugs 18 in the crawler width direction being increased in the rubber crawler 10 compared, for example, to cases in which the lugs 18 extend in a straight line along the crawler width direction, the resistance to lateral force in the crawler width direction is improved when driving on rough ground. The rubber crawler 10 thereby enables side-slip when driving on rough ground to be suppressed.

Moreover, in the rubber crawler 10, in a cross-section of the lugs 18 taken along the crawler peripheral direction, the angle θ3 formed between the base side portion 18FB of the kick-out-side wall face 18F and the outer peripheral face 12B is 90 degrees or greater, but is smaller than angle θ2. Thus in the rubber crawler 10, the spacing in the crawler peripheral direction between lugs 18 adjacent in the crawler peripheral direction can be widened compared to cases in which, for example, the angle θ3 is larger than the angle θ2. Thus in the rubber crawler 10, earth and mud can be suppressed from becoming lodged between lugs 18 adjacent in the crawler peripheral direction, and due to increasing the efficacy of earth and mud discharge, the lugs 18 reliably penetrate into the earth and mud, and traction and resistance to lateral force are further improved.

Moreover, in the rubber crawler 10, the angle θ1 of the tread-in-side wall face 18E of the lugs 18 is smaller at the crawler width direction outer side (the outer side end 18B side) than at the central line CL side (the inner side end 18A side). Due to such a configuration, in the rubber crawler 10, due to the force component of the driving force applied to the soil in the horizontal direction being increased at the crawler width direction outer side, the traction performance when driving on rough ground is effectively improved. Moreover, due to the above configuration, when driving on rough ground, the lugs 18 readily penetrate into the earth and mud, and traction and resistance to lateral force are further improved.

Moreover, in the rubber crawler 10, due to the angle θ1 of the tread-in-side wall face 18E of the lugs 18 being set within a range of from 102 degrees to 115 degrees, the traction performance when driving on rough ground can be further improved. Note that in cases in which the angle θ1 is smaller than 102 degrees, earth and mud is difficult to dislodge, and sufficient traction cannot be obtained. However, if the angle θ1 exceeds 115 degrees, then sufficient spacing cannot be secured between lugs 18 adjacent in the crawler peripheral direction, and sufficient traction cannot be obtained. Thus the angle θ1 is preferably set within a range of from 102 degrees to 115 degrees.

In the rubber crawler 10, as illustrated in FIG. 4, the inner side ends 18A on the central line CL side of each of the lugs 18 adjacent in the crawler width direction respectively overlap with a single rubber projection 14 as viewed from the crawler outer peripheral side. Thus in the rubber crawler 10, the rigidity to bending at the areas corresponding to the rubber projections 14 is larger, and the rigidity to bending at the areas corresponding to between the rubber projections 14 is smaller. Thus in the rubber crawler 10, due to the areas corresponding to between the rubber projections 14 at the sections entrained around the drive wheel 100 and the idle wheel 102 bending so as to have a curvature greater than that of the areas corresponding to the rubber projections 14, mud lodged between the lugs 18 when driving on rough ground can be dislodged starting from the areas corresponding to between the rubber projections 14.

In the rubber crawler 10, as viewed from the crawler outer peripheral side, each of the inner side ends 18A of the lugs 18 adjacent to each other in the crawler width direction are disposed at positions separated in the crawler width direction. Thus in the rubber crawler 10, since there are no projecting objects such as lugs 18 formed on the central line CL, mud can be suppressed from becoming lodged in the crawler width direction central portion, and even if mud were to become lodged, dislodging of the lodged mud is facilitated.

Moreover, in the rubber crawler 10, each of the inner side ends 18A of the lugs 18 that are respectively adjacent to each other in the crawler width direction overlap with each other when viewed along the crawler width direction. Thus in the rubber crawler 10, due to being able to achieve a wide spacing between the inner side ends 18A of the lugs 18 respectively adjacent to each other in the crawler peripheral direction, mud can be further suppressed from lodging in the central portion in the crawler width direction, and even if mud does become lodged, dislodging of the lodged mud is facilitated.

Moreover, in the rubber crawler 10, the angle of the lugs 18, on the acute angle side, to the crawler peripheral direction is larger at the crawler width direction outer side than that on the central line CL side thereof. Thus in the rubber crawler 10 the force component of the driving force applied to the soil in the horizontal direction is increased at the crawler width direction outer side of the lugs 18, and traction is improved.

The rubber crawler 10 accordingly suppresses lodging of mud when driving on rough ground, and improves traction performance.

Moreover, in the rubber crawler 10, the length W1 along the crawler width direction between inner side ends 18A of lugs 18 respectively adjacent to each other in the crawler width direction is set so as to be within a range of from 4% to 10% of a length W0 along the crawler width direction of the crawler body 12. Hence in the rubber crawler 10, the occurrence of mud lodging between each of the inner side ends 18A of the lugs 18 that are adjacent to each other in the crawler width direction can be suppressed. Note that in cases in which the length W1 is less than 4% of the length W0, sufficiently effective mud lodging suppression is not obtained. However, in cases in which the length W1 exceeds 10% of the length W0, due to the length of the lugs 18 along the crawler width direction being shorter, sufficient traction performance is not obtained. The length W1 is accordingly preferably set within a range of from 4% to 10% of the length W0.

Moreover, in the rubber crawler 10, due to the angle α formed between the inner side wall face 18G of the lugs 18 and the outer peripheral face 12B being set within a range of from 110 degrees to 120 degrees, occurrences of mud lodging between each of the inner side ends 18A of the lugs 18 can be further suppressed. Note that when the angle α is smaller than 110 degrees, sufficiently effective suppression of mud lodging between each of the inner side ends 18A of lugs 18 is not obtained. However, if the angle α exceeds 120 degrees, due to the length of the apex portions 18C of the lugs 18 along the crawler width direction being shorter, sufficient traction performance is not obtained. The angle α is accordingly preferably set within a range of from 110 degrees to 120 degrees.

In the rubber crawler 10, the protection cord layer 28 formed overlapping the plural protection plies 30 is disposed at the crawler outer peripheral side of the second bias cord layer 23. Thus in the rubber crawler 10, the speed with which cracking caused by external damage to the outer peripheral face 12B of the crawler body 12 propagates to the first bias cord layer 22 and the second bias cord layer 23 can be slowed. By extending the time until cracking reaches the bias cords 24A and the bias cords 26A in this manner, problems with the bias cords 24A and the bias cords 26A due to the penetration of water from outside can be suppressed for a long period of time, and the durability of the rubber crawler 10 is improved.

Moreover, in the rubber crawler 10, the first bias cord layer 22 is superimposed at the crawler outer peripheral side of the main cord layer 20, and the second bias cord layer 23 is superimposed at the crawler outer peripheral side of the first bias cord layer 22. Hence the bias ply 24 and the bias ply 26 are close to the main cord layer 20, enabling the deflection amount of the bias cords 24A and the bias cords 26A during turning to be reduced. This thereby enables buckling of the bias cords 24A and the bias cords 26A to be suppressed from arising. The occurrence of problems with the bias cords 24A and the bias cords 26A arising due to such buckling can thereby be suppressed for a long period of time, improving the durability of the rubber crawler 10. Moreover, as described above, due to the bias ply 24 and the bias ply 26 being close to the main cord layer 20, an action to prevent twisting of the main cords 20A can be effectively obtained, improving the directionality of the rubber crawler 10.

In the rubber crawler 10, due to the thickness T1 of the body inner peripheral portion 12C of the crawler body 12 being thicker than the thickness T2 of the body outer peripheral portion 12D, problems can be suppressed from arising in the body inner peripheral portion 12C that receives load from the drive wheel 100, the idle wheel 102, and the rollers 104.

In the rubber crawler 10, the main cord layer 20 is the neutral axis of bending for the sections entrained around the drive wheel 100 and the idle wheel 102. Thus by disposing the main cords 20A at the central portion in the crawler body thickness direction, a balance can be achieved between compression force acting on the inner peripheral surface 12A of the crawler body 12 and tension force acting on the outer peripheral face 12B. This thereby enables the durability of the crawler body 12 to be improved.

In the exemplary embodiment described above, although a configuration is adopted in which the main cord layer 20, the first bias cord layer 22, the second bias cord layer 23, and the protection cord layer 28 are embedded in the crawler body 12 in this sequence from the crawler inner peripheral side, the present invention is not limited to such a configuration. For example, the sequence may be changed for each of the cord layers, and the first bias cord layer 22, the second bias cord layer 23, or the protection cord layer 28 may be omitted.

Moreover, although in the exemplary embodiment described above the tread-in-side wall face 18E of the lugs 18 is angled such that the angle $\theta 1$ is smaller than the angle $\theta 2$, the present invention is not limited to such a configuration. For example, the tread-in-side wall face 18E of the lugs 18 may be angled such that the angle $\theta 1$ is larger than the angle $\theta 2$, or the tread-in-side wall face 18E of the lugs 18 may be angled such that the angle $\theta 1$ is the same as the angle $\theta 2$.

Although embodiments of the present invention have been explained by giving exemplary embodiments thereof, these exemplary embodiments are merely examples, and various modifications may be implemented within a range not departing from the spirit thereof. It also goes without saying that the scope of rights of the present invention is not limited by these exemplary embodiments.

The disclosure of Japanese Patent Application No. 2014-083144 filed on Apr. 14, 2014 is incorporated by reference in its entirety in the present specification.

All publications, patent applications and technical standards mentioned in the present specification are incorporated by reference in the present specification to the same extent as if the individual publication, patent application, or technical standard was specifically and individually indicated to be incorporated by reference.

The invention claimed is:

1. A crawler that has a specified rotation direction, the crawler comprising:
   a crawler body, that is formed from an elastic material in an endless shape, entrained around a drive wheel and a follower wheel;
   a plurality of projections that project out from an inner peripheral face of the crawler body on a central line passing through a crawler width direction center of the crawler body at positions spaced apart from each other in a crawler peripheral direction; and
   a plurality of lugs that are provided on the crawler body, that project out from an outer peripheral face of the crawler body,
   that, as viewed from a crawler outer peripheral side, are allocated to one side and another side in the crawler width direction so as to be alternately disposed on progression along the crawler peripheral direction on either side of the central line, wherein
   each lug comprises a corner portion represented by a portion of each lug that is located at the farthest forward point of each lug in relation to the rotation direction of the crawler, whereby the corner portions, located on pairs of lugs that are separated by the central line, are overlapped by a single projection, respectively, of the plurality of projections; and wherein
   as viewed from the crawler outer peripheral side, the lugs extend in a straight line at an angle to the crawler peripheral direction and are bent at a bent portion,
   a first acute angle is formed by the intersection of: (1) an extension line along a portion of each lug further toward the central line than the bent portion of each lug, and (2) a line formed along the crawler peripheral direction,
   a second acute angle is formed by the intersection of: (1) an extension line along a portion of each lug further toward the width direction outer side than the bent portion of each lug, and (2) a line formed along the crawler peripheral direction, and
   the first acute angle is smaller than the second acute angle.

2. The crawler of claim 1, wherein a length along the crawler width direction between the end portions on the central line side of the lugs adjacent to each other in the crawler width direction is within a range of from 4% to 10% of a length of the crawler body along the crawler width direction.

3. The crawler of claim 1, wherein the lugs are set with an angle formed between inner side wall faces on the central line side and the outer peripheral face that is within a range of from 110 degrees to 120 degrees.

4. The crawler of claim 1, wherein, in a cross-section of the lugs taken along the crawler peripheral direction, an angle formed between each apex side portion of forward wall faces on a crawler rotation direction side and the outer peripheral face is 90 degrees or greater, and is smaller than an angle formed between each apex side portion of rearward wall faces on the opposite side to the crawler rotation direction and the outer peripheral face.

5. The crawler of claim 4, wherein, in a cross-section taken along the crawler peripheral direction of the rearward wall faces of the lugs, an angle formed between each base side portion and the outer peripheral face is 90 degrees or greater, and is smaller than an angle formed between the apex side portions of the rearward wall faces and the outer peripheral face.

* * * * *